United States Patent [19]

Yamanaka

[11] Patent Number: 4,817,074
[45] Date of Patent: Mar. 28, 1989

[54] METHOD AND APPARATUS FOR DETECTING THE FOCUSING STATE AND POSITIONING ACCURACY OF A LIGHT BEAM DIRECTED ONTO AN OPTICAL DISK TRACKING GUIDE IN AN OPTICAL RECORDING SYSTEM

[75] Inventor: Yutaka Yamanaka, Tokyo, Japan
[73] Assignee: NEC Corporation, Tokyo, Japan
[21] Appl. No.: 943,224
[22] Filed: Dec. 18, 1986

[30] Foreign Application Priority Data
Dec. 19, 1985 [JP] Japan .............................. 60-287354
Jun. 17, 1986 [JP] Japan .............................. 61-141721

[51] Int. Cl.$^4$ ............................................... G11B 7/00
[52] U.S. Cl. ........................................ 369/46; 369/45; 369/112; 250/201
[58] Field of Search ............................ 369/43-46, 369/112; 350/286; 250/201 DF; 351/205

[56] References Cited
U.S. PATENT DOCUMENTS

| | | | |
|---|---|---|---|
| 4,560,259 | 12/1985 | Humphrey | 351/205 X |
| 4,631,395 | 12/1986 | Ando | 369/46 X |
| 4,719,614 | 1/1988 | Leterme et al. | 369/112 X |
| 4,730,899 | 3/1988 | Kime et al. | 369/44 X |

FOREIGN PATENT DOCUMENTS

| | | | |
|---|---|---|---|
| 57-18033 | 1/1982 | Japan | 369/46 |
| 58-200441 | 11/1983 | Japan | 369/46 |
| 38742 | 2/1985 | Japan . | |
| 60-246025 | 12/1985 | Japan | 369/46 |
| 2104687 | 3/1983 | United Kingdom | 369/46 |

OTHER PUBLICATIONS

Masayuki Inoue et al., Optical Head for an Optical Disk, 46th Scientific lecture meeting for Applied Physics Society, Autumn 1985.

Primary Examiner—Aristotelis M. Psitos
Attorney, Agent, or Firm—Sughrue, Mion, Zinn, Macpeak & Seas

[57] ABSTRACT

In method and apparatus of detecting tracking and focusing errors in an optical recording system, such means for dividing light beam reflected from an optical recording medium into four light beams as a quadrant prism is utilized. The light beam dividing means is provided with four sections from which the four light beams radiate with four different directions on a plane including a common straight line so that two inner light beams are utilized to detect the focusing error while two outer light beams are utilized to detect the tracking error.

7 Claims, 6 Drawing Sheets

METHOD AND APPARATUS FOR DETECTING THE FOCUSING STATE AND POSITIONING ACCURACY OF A LIGHT BEAM DIRECTED ONTO AN OPTICAL DISK TRACKING GUIDE IN AN OPTICAL RECORDING SYSTEM

FIELD OF THE INVENTION

The invention relates to method and apparatus for detecting tracking and focusing errors in an optical recording system, and more particularly to method and apparatus for detecting tracking and focusing errors in an optical recording system in which the detection of tracking and focusing errors is more stabilized and becomes higher in the sensitivity thereof and the cross-talk is lowered whereby the focusing error signal is less affected by the tracking error signal.

BACKGROUND OF THE INVENTION

An apparatus for detecting tracking and focusing errors in an optical recording system is described in Japanese laid open No. 38742/85 which was laid open on Feb. 28, 1985. That apparatus for detecting tracking and focusing errors in an optical recording system comprises a prism in which an upper half portion of light beam reflected from an optical disk is received and from which two-divided light beams radiate with predetermined symmetrical angles in regard to the axis of the incident light beam, two-separated photodiodes which receive the two-divided light beams respectively, and two-divided photodiodes in which a lower half portion of the light beam reflected from the optical disk and not passed through the prism is received.

In operation, the tracking error is detected in accordance with the comparison in level between the two outputs of the two-separated photodiodes while the focusing error is detected in accordance with the two outputs of the two-divided photodiodes.

In the apparatus for detecting tracking and focusing errors in an optical recording system as mentioned above, the construction thereof becomes smaller and simpler for the reason that the separated and divided photodiodes are positioned on a plane of a single photodetector.

According to that apparatus of detecting tracking and focusing errors in an optical recording system, however, the sensitivity of the detection thereof is not as high as expected for the reason that the diffraction light beams passing through the prism for detecting the tracking error therein are only half the light beam reflected from the optical disk.

On the other hand, there has been practically used an apparatus for detecting tracking and focusing errors only, that apparatus being adapted for use in an optical reproducing system which comprises a lens for focusing a light beam reflected from three spots on an optical disk, a cylindrical lens in which the light beam is received and from which three-divided light beams radiate with three different angles, and a photodetector including four-divided photodiodes in contact with each other and two-separated photodiodes positioned at outer sides thereof.

In operation, there are formed three spots on the optical disk, for instance, by diffraction gratings wherein one of the spots is positioned on a track on the optical disk while the two remaining spots are positioned at the right and left edges of the track respectively. The light beam reflected from the three spots on the optical disk is introduced through the focusing lens to the cylindrical lens to be divided into three light beams. The central light beam of the three-divided light beams is received in the four-divided photodiodes of the photodetector whereby the focusing error is detected in accordance with the astigmatism method to be described later in more detail, while the two remaining light beams at the outer sides of the central light beam are received in the two-separated photodiodes of the photodetector whereby the tracking error is detected in accordance with the comparison in level of the two outputs therefrom.

Even in such apparatus for detecting tracking and focusing errors only in an optical reproducing system, the construction thereof becomes smaller for the reason that the tracking and focusing errors are detected by a single photodetector having the separated and divided photodiodes.

However, the stability of detecting the tracking error is decreased in the apparatus mentioned above for the reason that the two spots are formed at the front and rear positions on the optical disk in regard to the central spot, thereby detecting the tracking error so that the reflection factor is changed at the front and rear positions on the optical disk when the recording operation is performed thereon by the central spot. A further disadvantage in the apparatus mentioned above is that the focusing error signal is affected by the tracking error signal for the reason that the detection of the focusing error is performed in accordance with the far-field in the astigmatism method as compared to the knife-edge method wherein the error is detected in accordance with a spot to be focused.

SUMMARY OF THE INVENTION

Accordingly, it is an object of the invention to provide a method and apparatus for detecting tracking and focusing errors in an optical recording system having an increased sensitivity in detecting tracking and focusing errors.

It is a further object of the invention to provide a method and apparatus for detecting tracking and focusing errors in an optical recording system having an increased stability of detecting tracking and focusing errors.

It is a still further object of the invention to provide a method and apparatus for detecting tracking and focusing errors in an optical recording system having a decreased cross-talk whereby the focusing error signal is less affected by the tracking error signal.

According to one feature of the invention, a method of detecting tracking and focusing errors in an optical recording system comprises, directing a light beam reflected from an optical recording medium to a predetermined direction, dividing said light beam directed to said predetermined direction into four light beams in accordance with two diagonals the crossing point of which is positioned at the axis of said light beam, focusing said four light beams on a detecting plane thereby producing four light beam spots to be positioned along a predetermined line thereon, and detecting the focusing error in accordance with the knife-edge method wherein two inner spots of said four light beam spots are utilized and the tracking error in accordance with the push-pull method wherein two outer spots thereof are utilized.

According to another feature of the invention, apparatus for detecting tracking and focusing errors in an optical recording system comprises, means for directing a light beam reflected from an optical recording medium to a predetermined direction, means for dividing said light beam directed to said predetermined direction into four light beams, a lens for focusing said four light beams on a detecting plane to produce four light beam spots to be positioned along a predetermined line thereon, and a photodetector provided with two sets of two-divided photoelements and with a set of two-separated photoelements all of which are positioned on said detecting plane including said predetermined line thereon, each of said two sets of said two-divided photoelements being close to one another and each of said two-divided photoelements being in contact across a split line with one another while said two-separated photoelements are positioned outside said two sets of said two-divided photoelements wherein said two sets of said two-divided photoelements output signals are for detecting the focusing error in accordance with the knife-edge method while said set of said two-separated photoelements output signals are for detecting the tracking error in accordance with the push-pull method.

BRIEF DESCRIPTION OF THE DRAWING

The invention will be explained in detail in accordance with the following drawings wherein.

DESCRIPTION OF THE PREFERRED EMBODIMENT

Figure 1:
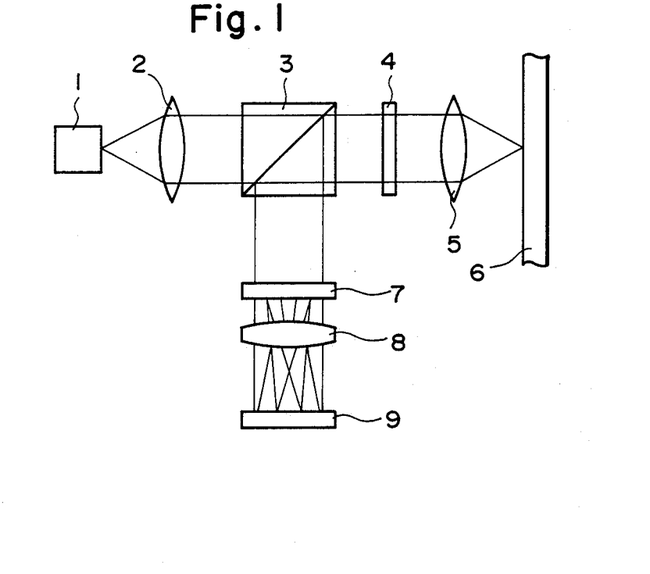
FIG. 1 is an explanatory diagram showing apparatus for detecting tracking and focusing errors in an optical recording system in the first embodiment according to the invention.

In FIG. 1, there is shown an apparatus for detecting tracking and focusing errors in an optical recording system in the first embodiment according to the invention which comprises a laser light source 1 from which a laser light beam (hereinafter simply called a light beam) radiates, a collimator lens 2 by which the light beam is collimated, a polarization beam splitter 3 in which the light beam is received from the collimator lens 2 and from which a polarized light beam radiates, a ¼ wavelength plate 4 positioned at the next stage of the polarization beam splitter 3, a lens 5 for focusing the light beam from the ¼ wavelength plate 4 on an optical disk 6, a quadrant prism 7 for dividing the light beam obtained from the polarization beam splitter 3 by reflecting the light beam reflected from the optical disk into four light beams, and a lens 8 for focusing the four light beams to form four light beam spots on a photodetector 9.

Figure 2:
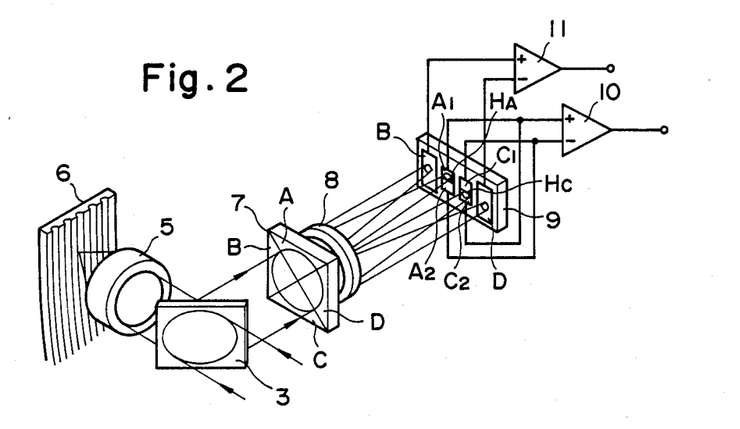
FIG. 2 is a perspective view illustrating apparatus of detecting tracking and focusing errors in an optical recording system in the first embodiment according to the invention.

FIG. 2 shows apparatus explained in FIG. 1 wherein like reference numerals indicate like parts, however, the laser light source 1, the collimator lens 2 and the ¼ wavelength plate 4 are not shown therein. The quadrant prism 7 is structured with four sections A, B, C and D having tilted planes to be described later in more detail. The photodetector 9 is provided with two sets of two-divided photodiodes $A_1$ and $A_2$, and $C_1$ and $C_2$, and a set of two-separated photodiodes B and D. The two-divided photodiodes $A_1$ and $A_2$ are in contact across a split line $H_A$ with one another, and so are the two-divided photodiodes $C_1$ and $C_2$ across a split line Hc. The two sets of the two-divided photodiodes $A_1$ and $A_2$, and $C_1$ and $C_2$ are positioned close to one other on the central portion of the photodetector 9 while the set of the two-separated photodiodes B and D are positioned at the outer opposite sides of the two sets of the two-divided photodiodes $A_1$ and $A_2$, and $C_1$ and $C_2$. The outputs of the photodiodes $A_1$ and $C_2$ are connected to the positive terminal of a comparator 10 while those of the photodiodes $A_2$ and $C_1$ to the negative terminal thereof. Further, the outputs of the photodiodes B and D are connected to the positive and negative terminals of a comparator 11 respectively. Such a photodetector 9 has been practically used for a compact disk apparatus.

Figure 3:
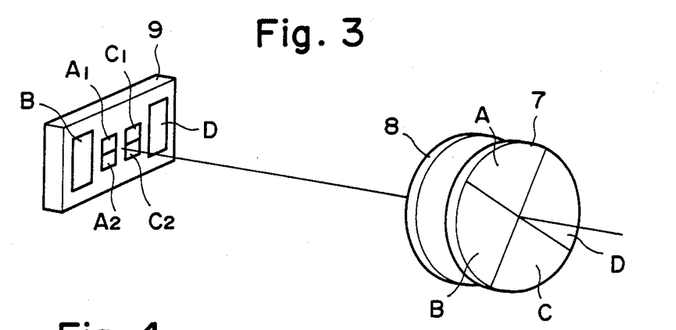
FIG. 3 is a perspective view illustrating a photodetector, a focusing lens, and a quadrant prism in an apparatus for detecting tracking and focusing errors in an optical recording system in the first embodiment according to the invention.

FIG. 3 shows the quadrant prism 7 having the sections A, B, C and D, the lens 8 for focusing the four light beams which radiate from the quadrant prism 7, and the photodetector 9 having the two sets of the two-divided photodiodes $A_1$ and $A_2$, and $C_1$ and $C_2$, and the set of the two-separated photodiodes B and D.

Figure 4:
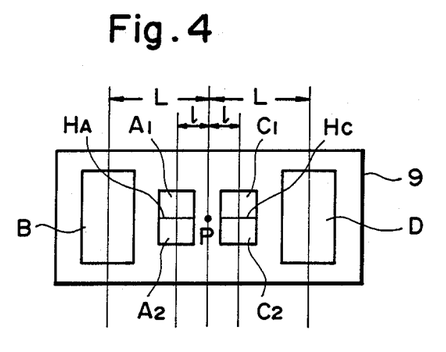
FIG. 4 is a plane view illustrating a photodetector in an apparatus for detecting tracking and focusing errors in an optical recording system in the first embodiment according to the invention.

FIG. 4 shows the photodetector 9 in which like reference letters indicate like parts. A newly indicated letter P designates the axis of the light beam to be received in the quadrant prism 7. The distance L between the center of the photodiodes B and D and the line on the light beam axis P is, for instance, 600 μm while the distance l between the center of the photodiodes $A_1$, $A_2$, $C_1$ and $C_2$ and the line on the light beam axis P is, for instance, 130 μm. The focal distance of the lens 8 is 20 mm.

Figure 5A:
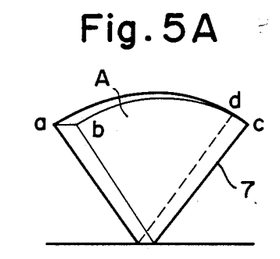
FIGS. 5A to 5C are explanatory views explaining a quadrant prism in an apparatus for detecting tracking and focusing errors in an optical recording system in the first embodiment according to the invention.
Figure 5B:
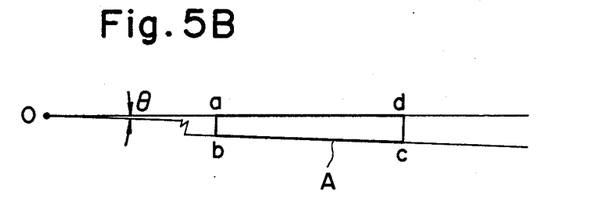
Figure 5C:
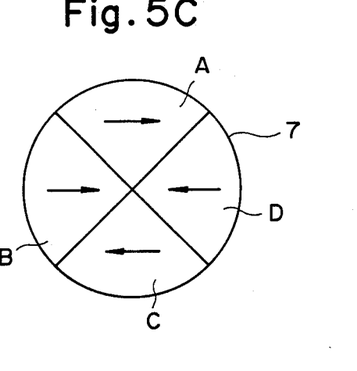

FIG. 5A shows the section A of the quadrant prism 7 having four tilted planes A, B, C and D, the four top edges of which are indicated by letters a, b, c and d. In FIG. 5B, there is shown a tilting angle $\theta$ the standard point 0 of which is fixed such that two lines parallel to the opposite planes of the section A are crossed. The tilting angle $\theta$ is 0.7° for the sections A and C and 3.4° for the sections C and D. FIG. 5C shows that the tilting direction is opposite between the sections A and C, and also between the sections B and D as indicated by each arrow.

Figure 6A:
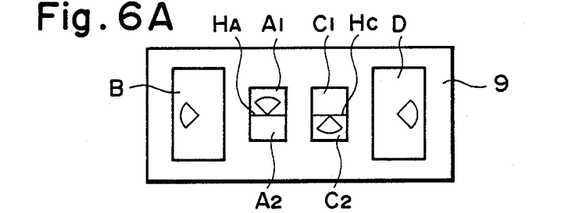
FIGS. 6A to 6C are explanatory views explaining the change in the shape of the light beam spots on photodiodes of a photodetector in an apparatus for detecting tracking and focusing errors in an optical recording apparatus in the first embodiment according to the invention.
Figure 6B:
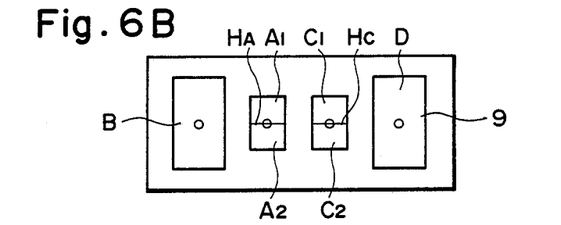
Figure 6C:
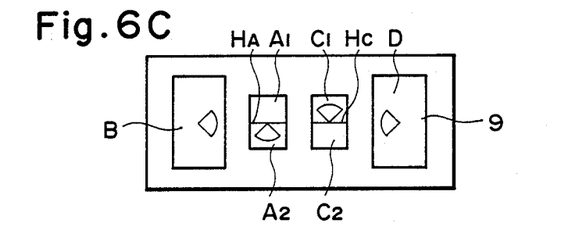

In operation, the light beam which radiates from the laser light source 1 upon the driving thereof is collimated by the collimator lens 2. The collimated light beam is passed through the polarization beam splitter 3 and goes through the ¼ wavelength plate 4 to be phase-controlled by 90°. The light beam therefrom is focused on the optical disk 6 by the lens 5 and is reflected thereon and returned to the lens 5 again. The light beam from the lens 5 is phase-controlled by an additional 90° and reflected in the direction orthogonal to the axis of the original light beam by the polarization beam splitter 3. The light beam thus reflected is received in the quadrant prism 7 from which the four light beams radiate in accordance with the tilting angle and its direction of the section A, B, C and D thereof. The four light beams are focused on the photodetector 9 by the lens 8 as shown in FIGS. 6A to 6C. The two spots move in the opposite directions orthogonal to the split lines $H_A$ and $H_C$ in accordance with the light beams passed through the sections A and C of the quadrant prism 7. Where there is no focusing error, the two spots are positioned exactly on the split lines $H_A$ and $H_C$ respectively, as shown in FIG. 6B. On the other hand, where the distance between the optical disk and means for recording and reproducing information is shorter than a predetermined distance, the spots corresponding to the sections A and C are enlarged in the shape of a fan and positioned above and under the split lines $H_A$ and $H_C$ respectively as shown in FIG. 6A. Further, there is shown in FIG. 6C a case where the above mentioned distance is longer than the predetermined distance. Accordingly, the focusing error is detected in accordance with the output of the comparator 10 connected to the two sets of the two-divided photodiodes $A_1$ and $A_2$, and $C_1$ and $C_2$.

Figure 6D:
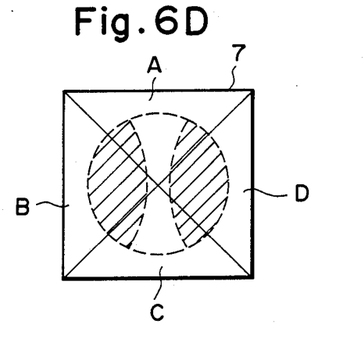
FIG. 6D is an explanatory view showing a quadrant prism in an apparatus for detecting tracking and focusing errors in an optical recording system in the first embodiment according to the invention.

In FIG. 6D, the sections B and D of the quadrant prism 7 are of portions through which diffraction light is passed in accordance with a groove for a track on the optical disk 6. Therefore, the tracking error is detected in accordance with the output of the comparator 11 connected to the photodiodes B and D of the photodetector 9 on which the spots are formed as shown in FIGS. 6A to 6C by the light beam passed through the sections B and D of the quadrant prism 7 as mentioned above. The detection of the focusing error is performed in accordance with the knife-edge method while the detection of the tracking error is performed in accordance with the push-pull method.

Figure 7:
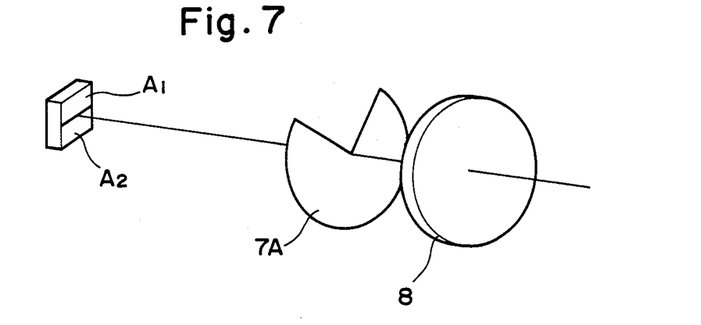
FIG. 7 is a perspective view illustrating the V-shaped knife-edge method in an apparatus for detecting tracking and focusing errors in an optical recording system in the first embodiment according to the invention.

One of the features in the invention is that the focusing error is detected in accordance with the same principle as the knife-edge method in which a V-shaped knife-edge 7A is utilized as shown in FIG. 7 (like letters indicate like parts). It was found by the inventor that such a knife-edge method is sufficiently adapted to apparatus of detecting focusing error.

Figure 8:
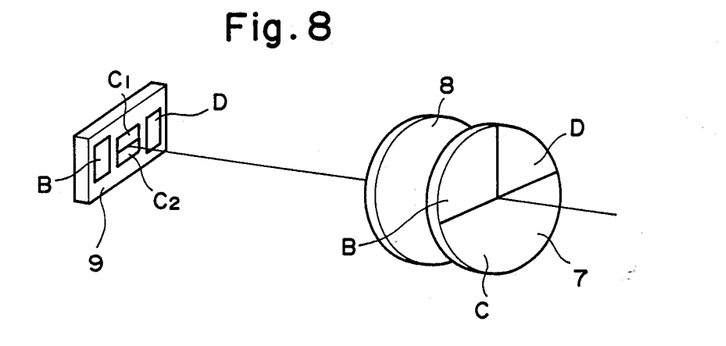
FIG. 8 is a perspective view illustrating an apparatus for detecting tracking and focusing errors in an optical recording system described in Japanese laid open No. 38742/85.

FIG. 8 shows apparatus of detecting tracking and focusing errors in an optical recording system which is described in Japanese laid open No. 38742/85 as explained before. The system comprises a three-divided prism 7 having sections B, D and C, a lens 8 for focusing three-divided light beams, and a photodetector 9 having four-divided photodiodes B, $C_1$ and $C_2$, and D.

In operation, the light beams passed through the sections B and D of the prism 7 are focused on the photodiodes B and D of the photodetector 9 by the lens 8 to detect tracking error while the light beam passed through the section C of the prism is focused on the photodiodes $C_1$ and $C_2$ by the lens 8 to detect focusing error.

In the apparatus as shown in FIG. 8, however, the light beam passed through the sections B and D of the prism 7 are only half the diffraction light for detecting the tracking error so that the sensitivity of the detection is decreased as compared to that of the invention as mentioned on page 2.

Figure 9:
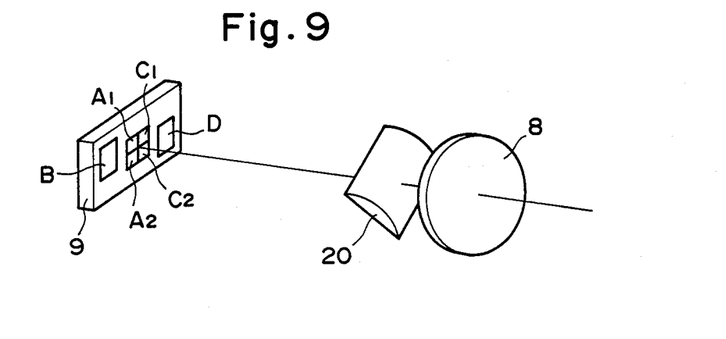
FIG. 9 is a perspective view illustrating an apparatus of detecting tracking and focusing errors in an optical recording system in accordance with the astigmatism method.

FIG. 9 shows apparatus for detecting tracking and focusing errors only adapted to an optical reproducing system as described on page 2 which comprises a lens 8, a cylindrical lens 20, and a photodetector 9.

Figure 10A:
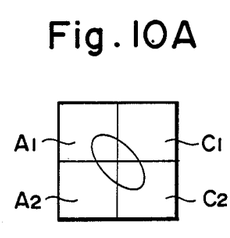
FIGS. 10A to 10C are explanatory views showing the astigmatism method in the apparatus in FIG. 9.
Figure 10B:
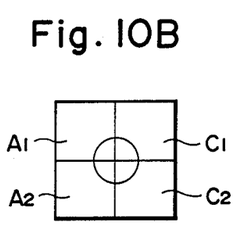
Figure 10C:
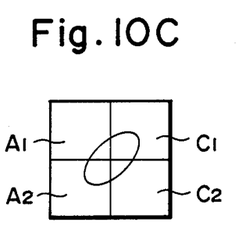

In operation, where the focusing error is occured, the spot on the photodiodes $A_1$ and $A_2$, and $C_1$ and $C_2$ of the photodetector 9 is changed in its shape as shown in FIGS. 10A to 10C. Therefore, the focusing error is detected in accordance with the astigmatism method. FIG. 10A shows a case where the distance between the optical disk and means for reproducing information therefrom is shorter, FIG. 10B for a case where the distance is equal to a predetermined distance, and FIG. 10C for a case where the distance is longer.

Figure 11:
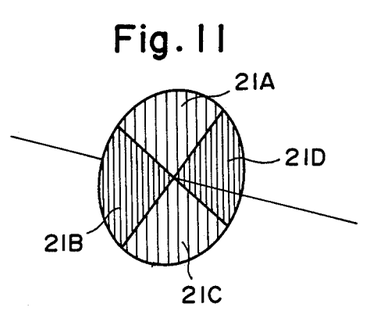
FIG. 11 is a perspective view illustrating diffraction gratings used in place of a quadrant prism in an apparatus for detecting tracking and focusing errors in an optical recording system in the first embodiment according to the invention.

In apparatus for detecting tracking and focusing errors in an optical recording system in the first embodiment according to the invention, there has been adopted a quadrant prism for dividing light beam reflected on an optical disk into four light beams. However, the quadrant prism may be replaced by diffraction gratings 21A, 21B, 21C, 21D, the groove or slit interval of which is varied in accordance with the angle of the four light beams to be radiated therefrom as shown in FIG. 11. Further, the quadrant prism may be replaced by four reflecting mirrors (not shown) the reflecting angle of which is varied in the reflecting direction of four light beams. Still further, the quadrant prism may be positioned after a lens for focusing light beam reflected on an optical disk.

Figure 12A:
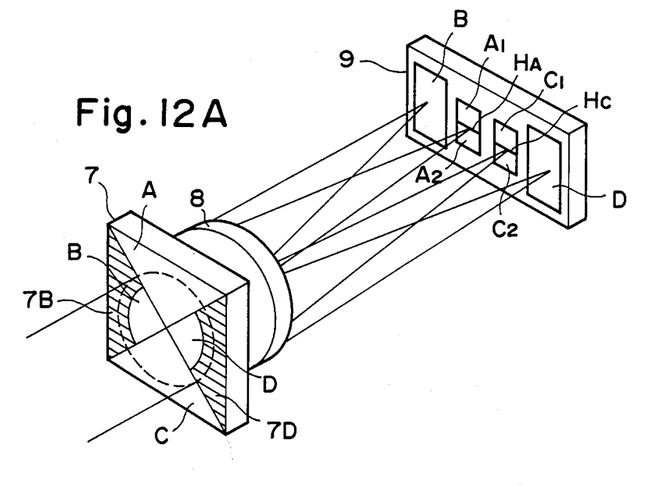
FIGS. 12A to 12C are perspective and explanatory views showing an apparatus for detecting tracking and focusing errors in an optical recording system in the second embodiment according to the invention.
Figure 12B:
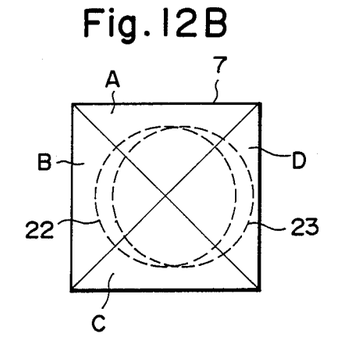
Figure 12C:
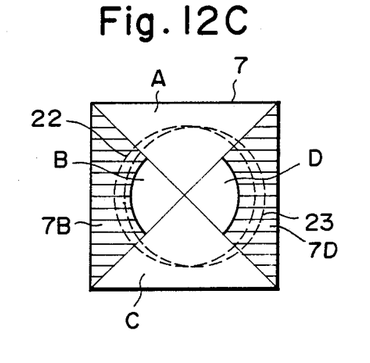

In FIGS. 12A to 12C, there is shown apparatus of detecting tracking and focusing errors in an optical recording system in the second embodiment according to the invention in which like reference numerals and letters indicate like parts except that sections B and D of a quadrant prism 7 are covered partly at the outer portion thereof by light shielding layers 7B and 7D.

In operation, the tracking error is detected precisely in accordance with light beams passed through the sections B and D even though light beam reflected from an optical disk is changed in its position on the quadrant prism 7 as shown by reference numerals 22, 23 in FIG. 12B due to the moving of a pick-up head for tracking on the optical disk.

If the shielding layers 7B and 7D are not provided on the quadrant prism 7, there occurs an off-set in tracking error signals which are produced from the photodiodes B and D of the photodetector 9 so that the precision of the detection is lowered.

In the second embodiment according to the invention, the light shielding layers 7B and 7D may be replaced by providing light scattering planes thereon.

Although the invention has been described with respect to specific embodiments for complete and clear disclosure, the appended claims are not to be thus limited but are to be construed as embodying all modification and alternative construction that may occur to one skilled in the art which fairly fall within the basic teaching herein set forth.

What is claimed is:

1. Method of detecting tracking and focusing errors in an optical recording system having a light beam reflected from an optical recording medium comprising the steps of,
    directing said light beam reflected from said optical recording medium in a predetermined direction,
    dividing said light beam directed in said predetermined direction into four light beams in accordance with two diagonals the crossing point of which is positioned at the axis of said light beam,
    focusing said four light beams on a detecting plane thereby producing for light beam spots to be positioned along a predetermined line thereon, and
    detecting the focusing error, in accordance with the knife-edge method wherein two inner spots of said four light beam spots are utilized, and the tracking errors in accordance with the push-pull method wherein two outer spots thereof are utilized.

2. Method of detecting tracking and focusing error in an optical recording system according to claim 1, wherein
    said step of dividing said light beam comprises a step of directing two light beams radiating from two vertically opposite sections in an area defined by said two diagonals towards positions corresponding to said two inner spots and two remaining light beams radiating from two horizontally opposite sections in said area towards positions corresponding to said two outer spots.

3. Apparatus for detecting tracking and focusing errors in an optical recording system having a light beam reflecting from an optical recording medium comprising,
    means for directing said light beam reflected from an optical recording medium in a predetermined direction,
    means for dividing said light beam directed in said predetermined direction into four light beams,
    a lens for focusing said four light beams on a detecting plane to produce four light beam spots to be positioned along a predetermined line thereon, and
    a photodetector provided with two sets of two-divided photoelements and with a set of two-separated photoelements all of which are positioned on said detecting plane including said predetermined line thereon, each of said two sets of said two-divided photoelements being close to one another and each of said two-divided photoelements being in contact across a split line with one another, said two-separated photoelements being positioned outside said two sets of said two-divided photoelements wherein said two sets of said two-divided photoelements produce signals for detecting the focusing error in accordance with the knife-edge method, and said set of said two-separated photoelements produce signals for detecting the tracking error in accordance with the push-pull method.

4. Apparatus for detecting tracking and focusing errors in an optical recording system according to claim 3, wherein
    said means for dividing said light beam is a quadrant prism,
    said quadrant prism having four sections defined by two diagonals the crossing point of which is positioned at the axis of said light beam and each plane of said four sections being tilted with different angles.

5. Apparatus for detecting tracking and focusing errors in an optical recording system according to claim 4, further comprising shielding means for partly treating two signals of said four sections of said quadrant prism as non-light passing area for detecting the tracking error.

6. The apparatus of claim 5 wherein said shielding means comprises light scattering planes.

7. The apparatus of claim 5 wherein said shielding means comprises light shielding layers.

* * * * *

UNITED STATES PATENT AND TRADEMARK OFFICE
CERTIFICATE OF CORRECTION

PATENT NO. : 4,817,074

DATED : 3/28/89

INVENTOR(S) : Yamanaka

It is certified that error appears in the above-identified patent and that said Letters Patent is hereby corrected as shown below:

Column 4, line 35, after "disk", insert --6--;

Column 7, line 32, delete "for", insert --four--;

Signed and Sealed this

First Day of October, 1991

Attest:

HARRY F. MANBECK, JR.

Attesting Officer

Commissioner of Patents and Trademarks